United States Patent
Pernyeszi

[19]

[11] Patent Number: 6,069,472
[45] Date of Patent: May 30, 2000

[54] CONVERTER/INVERTER USING A HIGH EFFICIENCY SWITCHING CIRCUIT

[75] Inventor: Joseph Pernyeszi, Scotts Valley, Calif.

[73] Assignee: General Electronics Applications, Inc., Scotts Valley, Calif.

[21] Appl. No.: 09/246,030

[22] Filed: Feb. 5, 1999

[51] Int. Cl.⁷ ........................................................ G05F 1/40
[52] U.S. Cl. ............................................................ 323/282
[58] Field of Search ................................. 323/282, 290, 323/225, 222

[56] References Cited

U.S. PATENT DOCUMENTS

| | | | |
|---|---|---|---|
| 4,408,267 | 10/1983 | Pruitt | 363/17 |
| 5,019,770 | 5/1991 | Harada et al. | 323/282 |
| 5,107,151 | 4/1992 | Cambier | 307/570 |
| 5,673,188 | 9/1997 | Lusher et al. | 363/132 |
| 5,747,976 | 5/1998 | Wong et al. | 323/282 |
| 5,771,166 | 6/1998 | Lim | 363/132 |

*Primary Examiner*—Shawn Riley
*Attorney, Agent, or Firm*—Townsend and Townsend and Crew LLP

[57] ABSTRACT

A PWM inverter includes a first and a second switching transistor to generate power at an output voltage which is a function of a duty cycle of an input control signal and voltages at a positive rail and a negative rail, wherein the first switching transistor switches current from the positive rail through a first current node to an output load and the second switching transistor switches current from the negative rail through a second current node to the output load. The PWM inverter also includes a number of components to capture switching power, such as a first inductor coupled between the first current node and a first intermediate node and a second inductor coupled between the second current node and a second intermediate node, a first output inductor coupled between the first intermediate node and an output node, and a second output inductor coupled between the second intermediate node and the output node. A first diode pair is coupled between the second current node and the positive rail wherein current flows from the second current node to the positive rail when the first diode pair is forward biased. A second diode pair is coupled between from the negative rail and the first current node wherein current flows from the negative rail to the first current node when the second diode pair is forward biased. The circuit can also be used in pulse frequency circuits.

16 Claims, 15 Drawing Sheets

CONVERTER/INVERTER USING A HIGH EFFICIENCY SWITCHING CIRCUIT

BACKGROUND OF THE INVENTION

The present invention relates to the field of pulse width modulation ("PWM") and power converters. More specifically, one embodiment of the invention provides an improved apparatus for converting power at one DC ("direct current") voltage to power at another DC voltage ("DC/DC converter") or converting power at a DC voltage to power at an AC ("alternative current") voltage ("inverter").

FIG. 1 is a schematic diagram of a circuit 10 for generating an output voltage based on a duty cycle of a pulse width modulated signal. Such a circuit is widely used in motor drive and uninterruptible power supply ("UPS") applications as well as in DC/DC converters. Circuit 10 is shown comprising two transistors 12, 14 interposed in series between positive (V+) and negative (V−) voltage rails. The transistors 12, 14 connect at an intermediate node, designated here as node 16. A diode 17 is placed between node 16 and the V+ rail for flowing current from node 16 to the V+ rail when the voltage at node 16 exceeds the V+ rail voltage by more than a diode drop and a diode 18 is placed between node 16 and the V− rail for flowing current from the V− rail to node 16 when the voltage at node 16 falls more than a diode drop below the V− rail voltage. An inductor 19 is placed between node 16 and an output terminal $V_{OUT}$ to even out the flow of current throughout a duty cycle of a PWM input signal. In some cases, inductor 19 is part of the load itself. A motor is one example of an inductive load.

In operation, the gates of transistors 12, 14 are driven by a varying duty cycle PWM signal, $V_{IN}$, and its complement, $V_{IN\#}$. Inductor 19 at the output acts as a low pass filter to recover the modulating signal. In motor drive and UPS applications, the modulating signal is usually a sine wave, while in DC/DC conversion applications, the modulating signal is a slowly varying DC voltage. Typically, the rail voltages are much larger than the drain-source voltage drops of transistors 12, 14, and therefore, circuit 10 efficiently transfers power from the rails to the output. A specific application might use V+=+300V and V−=−300V.

FIG. 2 shows an example of the input waveforms and node waveform as might occur when the instantaneous output voltage to be generated is $V_{OUT}$=+200V. To achieve this output voltage, transistor 12 is turned on for ⅚ of a PWM cycle and transistor 14 is turned on for the remaining ⅙ of the PWM cycle. The current flowing through the transistors 12, 14 flows through inductor 19 to the output $V_{OUT}$. As shown in FIG. 2, when transistor 12 is turned on at time $t_0$, node 16 will be at nearly +300V and $V_{OUT}$ will be at +200V, giving a +100V drop across inductor 19 (the +200V is present at the output because of previous cycles not shown in FIG. 2). From time $t_0$, the current through inductor 19 will increase at a rate of $((V+)-V_{OUT})/L$, or +200V/L, and thus the current increase from $t_0$ to $t_1$, during which time transistor 12 is on, is $[(V+)-V_{OUT}]/L](t_1-t_0)$.

At time $t_1$, transistor 12 is turned off and transistor 14 is turned on. From $t_0$ to $t_1$, inductor 19 stored energy, E, equal to $½*LI^2$, where I is the inductor current at time $t_1$. After transistor 14 is turned on, the voltage at node 16 is nearly −300V and $V_{OUT}$ is +200V. With the change in voltage across inductor 19, inductor 19 will lose current at the rate of $((V-)-V_{OUT})/L$, or −500V/L. During this second interval ($t_1$ to $t_2$), the output current can be maintained from the energy the inductor accumulated in the first interval ($t_0$ to $t_1$).

In the steady state, the current in inductor 19 drops at time $t_2$ to the same value it had at time $t_0$ (and if $V_{IN}$ is periodic, the signals from $t_2$ on are equivalent to those from $t_0$ on). In both intervals, the direction of current through inductor 19 is the same. In the first interval, the current flows from the V+ rail through transistor 12, and then through inductor 19 to the output node $V_{OUT}$. During the second interval, the current flows from the V− rail through transistor 14, or diode 18 depending on the type of transistor used, and then through inductor 19 to node $V_{OUT}$. The current flows from the V− rail through inductor 19 because inductor 19 forces node 16 below V− to keep current flowing. If transistor 14 is a DMOS ("double diffused MOS") transistor, diode 18 is included as part of the transistor itself. If transistor 14 is an IGBT ("insulated gate bipolar transistor"), diode 18 is physically separate from transistor 14. In either case, current flows through diode 18 during the second interval.

It is well known that, during forward conduction, charge is stored in a diode and this charge has to be removed before the diode will turn off, resulting in a "reverse recovery time" which is nonzero. IGBT transistors also store charge during conduction that needs to be removed before the transistor will turn off, resulting in a nonzero turn-off time. However, for efficient operation of circuit 10, transistors 12, 14 and diode 18 must change conduction state in as short a time as possible to avoid loss of energy and stress on the components. Furthermore, the gate parasitic inductance is part of the gate-source path and that inductance must be low enough so that transistor 14 does not turn on at $t_2$.

Referring to FIG. 2, when the signals $V_{IN}$ and $V_{IN\#}$ switch at $t_1$, transistor 12 does not turn off as fast as transistor 14 turns on, since the turn-on time for the transistors is shorter than the turn-off time. With such asymmetric switching times, both transistors will conduct temporarily between the on-switching of one transistor and the off-switching of the other transistor. This is very detrimental to the circuit's efficiency and the components involved. If both transistors 12 and 14 were on at the same time, a very high current would flow from the V+ rail to the V− rail, through the transistors 12, 14. The voltage across the transistors is 600V and the current is many times higher than the normal operating current of the transistors, creating a very high instantaneous power dissipation and resultant heating of the transistors.

The problem of having both transistors on at the same time can be avoided by skewing $V_{IN}$ and $V_{IN\#}$ such that there is a "dead time" between when the gate of transistor 12 is driven low by $V_{IN}$ and the gate of transistor 14 is driven high by $V_{IN\#}$, and vice versa. Even with this problem solved, another similar problem occurs at $t_2$, when transistor 14 is turned off and transistor 12 is turned on. During the second interval (from $t_1$ to $t_2$), diode 18 conducts current from the negative rail to inductor 19. At the end of the second interval, transistor 14 is turned off and, after the dead time, transistor 12 is turned on. Even though transistor 14 is off by the time transistor 12 turns on, diode 18 still conducts current from inductor 19, since node 16 is below the negative rail voltage due to the stored energy in inductor 19. When transistor 12 turns on, it will supply current to inductor 19 through node 16 and pull node 16 positive toward the V+ rail, in effect rerouting the current that was flowing to inductor 19 from the V− rail through diode 18. Eventually, the voltage at node 16 will rise and diode 18 will turn off. However, before diode 18 can turn off, it must lose its stored charge. Therefore, there is a small period where diode 18 is reverse biased but is still on. While the stored charge in diode 18 is being removed, a very high current will flow from the V+ rail through transistor 12 and diode 18 to the V− rail. This current flows across the full 600V and results in high power dissipation in transistor 12 and diode 18, causing excessive heating of these components and reducing circuit efficiency.

To limit this second problem, fast recovery diodes are used for diodes 17, 18. Even with fast recovery diodes, there is a nonzero recovery time during which transistor 12 must carry the sum of the inductor current and the reverse recovery current of diode 18. The reverse recovery current can be many times the inductor current, putting a high stress on transistor 12 and other components. Having transistor 12 turn on gradually, so that diode 18 can become reverse biased and lose its stored charge before transistor 12 turns completely on can reduce this problem. While this reduces the energy loss through diode 18 during diode reverse recovery, energy loss due to the simultaneous presence of high voltage and current across transistor 12 increases when a relatively slow switching period is used.

A further problem with circuit 10 is that transistor 12 imposes an unnecessarily high rate of voltage change (dV/dt) on transistor 14. Since transistor 14 must remain in the off state during the transition at time $t_2$, transistor 14 must have a very low impedance gate drive circuit to be able to shunt the current injected into the gate of transistor 14 by its own gate-drain capacitance. At $t_2$ (which is the same as $t_0$ for a periodic $V_{IN}$), the sharp increase in voltage at node 16 will cause a current to flow through the drain/gate capacitance (I=C * dV/dt) of transistor 14. With a nonzero impedance in the $V_{IN\#}$ signal source, that current flow will cause the voltage at the gate of transistor 14 to rise (by I times the source impedance), and that increase in voltage will try to turn on transistor 14, as the signal source is connected across the gate and source of transistor 14.

This requirement complicates the gate drive circuit. If one chooses to reduce losses using the gradual turn-on approach described above, then the gate drive circuit must have a higher impedance when the transistor is to be turned on and a lower impedance when the transistor is to be turned off. This requires additional components, increasing cost and circuit board space. In many cases, the gate circuit parasitic inductance by itself is high enough that, combined with a nonzero impedance in a gate drive circuit, results in a transistor erroneously turning on due to the voltage increase at the gate from that parasitic inductance. To avoid this, a negative voltage might be applied between the gate and the source, but this requires an additional power supply, adding even more cost to the circuit.

FIG. 3 is a schematic of a circuit 30 that has been used to solve some, but not all, of the foregoing problems. Circuit 30 is similar to circuit 10 in FIG. 1, with an additional parallel diode/inductor circuit in series with diode 17 and a similar circuit in series with diode 18. As shown in FIG. 3, a diode 32 is in parallel with an inductor 36 and both are in series with diode 17, while a diode 34 is in parallel with an inductor 38 which are both in series with diode 18. Relative to inductor 19, inductors 36, 38 are of a much smaller inductance.

Minimizing the dead time and using two diodes in place of one with an inductor across one of the diodes reduces switching losses. At least one of diodes 17, 32, 18, 34 will not be conducting at any given time. At $t_2$, diode 34 is not conducting. Instead of current flowing through diode 34, the output current flows through diode 18 and inductor 38. This allows diode 34 to be already in the off state when the next switching occurs. At $t_2$, inductor 38 and diode 34 will allow the voltage at node 16 to rise, giving time for diode 18 to turn off without high current through transistor 12.

Circuit 30 does not solve all of the problems with these circuits, as it does not prevent excessive current flow along the transistor 12 to transistor 14 path when the dead time is not long enough to prevent both transistors from being on simultaneously. The problem with transistor 12 imposing a high dV/dt on transistor 14 is also not solved with circuit 30.

FIG. 4 is a schematic of a circuit 40 developed by the present inventor which prevents both types of "shoot-through" current (due to simultaneously on transistors and diode reverse recovery times), but at the expense of using capacitors and resistors. Circuit 40 is similar to circuit 10, but with the addition of a four-component circuit inserted in series between each of the transistors and their associated rails. An inductor 41 is in series between the V+ rail and the drain of transistor 12, while a diode 42 is in series with an RC circuit and the diode-RC combination is in parallel with inductor 41. The RC circuit comprises a capacitor 43 and a resistor 44 in parallel. A similar circuit is interposed between transistor 14 and the V− rail using inductor 46, diode 47, capacitor 48 and resistor 49. Any energy accumulated in inductor 41 (built up when transistor 12 is on and current is flowing from the V+ rail through transistor 12) is dissipated by resistor 44 when transistor 12 turns off and inductor 41 needs to keep current flowing. Likewise, energy accumulated in inductor 46 when transistor 14 is on is dissipated by resistor 49. This is undesirable because it causes circuit heating and loss of power transfer efficiency.

Yet another problem in the above-described circuits is that the fast recovery (freewheeling) diodes have a slow forward recovery. In other words, there is a delay between the time a forward bias has been applied to the diode and the time the diode begins to conduct. So long as there is a forward bias (i.e., node 16 is outside the rail voltages) and no diode has turned on, the voltage across one of the transistors will be in excess of 600V. In part, the delay in getting conduction through the diodes is due to the parasitic inductances in series with the diodes.

FIG. 5 is a schematic of circuit 10 with the circuit's parasitic inductances explicitly shown as inductors L1 to L8. These parasitic inductances are due, at least in part, to the nonzero lengths of the circuit interconnections. When circuit 10 is switching, voltage spikes develop across the inductors. Such spikes are particularly troublesome after the reverse recovery (shut off) of diode 18 at $t_2$, when the current through diode 18 drops suddenly, thereby causing a negative voltage spike at node 16 and at the source of transistor 12 as parasitic inductances L5 and L8. L5 and L8 try to keep current flowing through themselves. L3 acts likewise and tries to pull the drain transistor 12 positive with respect to the V+ rail. That negative voltage spike at the source and the positive spike at the drain will increase the voltage across transistor 12. Because of this, a circuit 10 is usually designed with 600V transistors for 300V rail-to-rail voltage (or double the supply voltage) to handle the normal rail-to-rail voltage plus the excess voltage resulting from the voltage spikes. This was the disadvantage that slower, more expensive transistors must be used. A voltage spike will also appear across L6 and L7 if the dead time is not sufficient for commutating transistors 12 and 14, which also requires higher voltage transistors to withstand the spikes.

FIG. 6 is a schematic of an inverter circuit 60 that improves somewhat on the circuits described above. In circuit 60, the functions of transistors 12, 14, diodes 17, 18 and inductor 19 are as previously described. However, an inductor 62 is interposed in series between the source of transistor 12 and node 16, while an inductor 64 is interposed in series between node 16 and the drain of transistor 14. A diode pair 66 is connected to flow current from the drain of transistor 14 to the V+ rail should that drain rise above V+. A second diode pair 68 is connected to flow current from the V− rail to the source of transistor 12 should that source drop below V−. As with the circuits shown in FIGS. 1, 3 and 4, in normal operation, circuit 60 is cycled through two intervals. In the first interval, transistor 12 is turned on and in the second interval, transistor 14 is turned on. The relative lengths of the intervals (duty cycle) determine the output voltage.

During the first interval (the time period from time to $t_0$ time $t_1$ in the timing diagrams), current in circuit 60 flows from the V+ rail through transistor 12, inductor 62 and inductor 19 to the output $V_{OUT}$. At $t_1$, transistor 12 turns off and transistor 14 turns on. If transistor 12 does not turn off quickly enough before transistor 14 turns on, a small amount of current will build up in inductor 64 due to the conduction path through transistors 12, 14 and inductors 62, 64. After transistor 12 stops conducting, node 16 and node 70 (the source of transistor 12) will drop in voltage due to the energy stored in inductors 62 and 19. The drop in voltage at node 70 will cause the voltage at node 72 (the drain of transistor 14) to rise due to the energy stored in inductor 64, which generates current through transistor 14. The result is that the load current (the current through inductor 19) will be carried and shared by: 1) inductor 62 and diode pair 68, 2) inductor 64 and transistor 14, and 3) diode 18. This allows most of the energy stored in the inductors 62, 64 to be recovered.

At $t_2$, transistor 14 is turned off and transistor 12 is turned on. When that happens, the voltage at node 16 will drop until it is below V− and diode 18 turns on to carry the load current. With suitable component values, inductor 62 will have essentially discharged by this time, and since diode 18 does not have enough of a voltage across it to turn on diode pair 68, diode pair 68 is off.

As transistor 12 turns on, current will start to build up in inductor 62, increasing until it equals the load current flowing through inductor 19. The time it takes for the current to increase to that point can be designed into circuit 60 by selecting the appropriate value for inductor 62. The gate signal $V_{IN}$ to transistor 12 can be switched at the same time as the gate signal $V_{IN\#}$ to transistor 14, because inductors 62 and 64 limit the current that can pass through transistors 12 and 14 from rail to rail to a value much less than the normal operating current the transistors must support.

Because of this, the amount of time where both voltage and current are simultaneously present on transistor 12 is reduced, thus reducing power dissipation during turn-on. After the current in inductor 62 equals the load current, the current will stop increasing, causing the voltage across inductor 62 to drop, thereby raising the voltage of node 16. The voltage at node 16 will rise until diode 18 is reverse biased. Before that happens, however, diode 18 is on and has stored charge. As the voltage increases at node 16, diode 18 will respond with its reverse recovery current flowing from node 16 to the V− rail. This reverse recovery current is provided by inductor 62. The rate of increase of current in inductor 62 is limited to [(V+)−(V−)]/L62 (the voltage drops across transistor 12 and diode 18 are much less than the rail-to-rail voltage, so those voltage drops are left out of this equation for simplicity) where L62 is the inductance of inductor 62. Because of this limit, the rate at which sufficient current can be obtained to supply the reverse recovery current of diode 18 is limited. Limiting the reverse recovery current is important because its value can be from 10 to 100 times the normal operating current. The reverse recovery current is limited without slowing the transistors' switching speed, but circuit 60 still has additional disadvantages as explained below.

Once all the stored charge is removed from diode 18, it turns off and the voltage at node 16 is free to increase. As the load current flows through inductor 62, the voltage at node 16 will increase as the excess energy of inductor 62 is discharged and the voltage drop across inductor 62 decreases. Eventually, the voltage across inductor 62 will decrease so far that node 16 is more positive than node 70. This additional voltage (the voltage increase at node 16) allows the recovery of a small part of the excess stored energy of inductor 62, but the rest of the excess stored energy turns into heat dissipated in transistor 12 and diode 17.

Inductor 62 retains a high current until its stored energy is discharged. As mentioned above, the voltage across inductor 62 when node 16 goes positive is the sum of the on-state voltages of transistor 12 and diode 17. This amounts to a few volts. At that voltage, the discharge of inductor 62 takes a significant portion of the pulse width, and for the duration, the current remains relatively high through transistor 12 and diode 17. This detracts from the effectiveness of this technique to reduce stress on the components and to reduce power dissipation. The additional voltage amounts to the forward drop on diode 17, which is below 1V.

A specific example illustrates the effect of the circuit's operation. Assume a load current in inductor 19 of 10 A (amps). With that load current, the peak reverse recovery current in diode 18 might be about 30 A (limited by inductor 62). That 30 A current will continue to flow through inductor 62 even after the voltage at node 16 rises above V+, but diode 17 will limit the voltage rise at node 16 to about 1V above V+. At that point, the 30 A through diode 18 is split with 10 A flowing through inductor 19 and the other 20 A flowing through diode 17. The 30 A flows through transistor 12, causing some excess voltage drop across transistor 12. The current in inductor 62 has to drop to 10 A (the load current) by discharging its excess energy. The energy directed to the load is proportional to the voltage rise of node 16 above V+ and the load current. The loss is proportional to the excess voltage drop across transistor 12 multiplied by the current through transistor 12 (30 A) and the forward voltage of diode 17 and the current through it (20 A). As a result, inductor 62 (and inductor 64) reduces the peak current during reverse recovery, allowing for lower powered circuit devices, but most of the stored energy is dissipated in transistor 12 and diode 17.

Diode pairs 66, 68 are selected for optimum forward recovery to prevent any excess voltage in circuit 60 by effectively clamping the voltage across the transistors 12, 14 to the V+ and V− rails. Since the inductors 62, 64 prevent the build-up of high currents through the transistors, the components of circuit 60 are exposed to minimal stress irrespective of whether or not a dead time is used. By recovering part of the stored energy from inductors 62, 64 and switching transistors 12, 14 quickly, circuit 60 improves the efficiency of circuit 60 somewhat, but still dissipates excessive stored power.

While the transistors 12, 14 switch at maximum speed, the change in voltage (dV/dt) imposed on the transistor that is in the off state is lower than in circuit 10, because of the inductors used in series with the transistors. Also, the inductors 62, 64 have the effect of forming a low pass filter with their corresponding transistor's internal capacitance. For example, at $t_2$ the voltage at node 16 is rising and the voltage at node 72 will rise slower due to inductor 64 and the collector capacitance of transistor 14.

FIGS. 7(a)–(e) form a timing diagram showing the voltages at various nodes in the circuit of FIG. 6 over a little more than one cycle of $V_{IN}$. The vertical scales are not necessarily the same from line to line and the time scale is not necessarily to scale, so as to emphasize the relevant features of the voltages. FIG. 7(a) shows the signal applied to $V_{IN}$, while FIG. 7(b) shows the signal applied to $V_{IN\#}$. It should be noted that $V_{IN}$ rises when $V_{IN\#}$ falls and vice versa (no overlap is needed).

FIGS. 7(c)–(d) show the voltages, $V_{70}$ and $V_{72}$, at nodes 70 and 72, respectively. At $t_0$, when transistor 12 turns off and transistor 14 turns on, $V_{70}$ falls to below V− as inductor 62 attempts to maintain its current flow just before the transition. $V_{70}$ falls until diode pair 68 turns on and shunts the inductors' stored energy through the path provided by diode pair 68, inductor 62, and inductor 19. $V_{72}$ drops to follow node 16 as inductor 64 seeks to maintain its prior state of no current flow. Once inductor 62 is de-energized, $V_{70}$ rises to just below V−. $V_{70}$ is pulled below V− by the combined action of inductor 62 having no stored energy and zero voltage across it and inductor 19 trying to maintain its current flow. As shown in FIG. 7(c), the fall of $V_{70}$ stops when diode pair 68 turns on.

At $t_1$, when transistor 14 turns off and transistor 12 turns on, $V_{70}$ rises to just below V+ since transistor 12 is on. $V_{16}$ and $V_{72}$ rise above V+ as inductor 62 attempts to maintain the current flow it built up just before $t_1$ from the reverse recovery of diode 18, until diode pair 66 and diode 17 turn on and shunt the inductor's (62) stored energy through transistor 12, inductor 62, and diode 17. $V_{70}$ rises as transistor 12 turns on. Once inductor 62 is de-energized, $V_{70}$ and $V_{72}$ settle to just below V+.

FIG. 7(e) shows the voltage $V_{16}$ at node 16. At $t_0$, transistor 12 turns on and transistor 14 turns off. Initially, the voltage on node 16 does not change because diode 18 is able to conduct current for a short time, $t_e$, as diode 18 releases its reverse recovery charge. Once diode 18 turns off, $V_{16}$ rises to $(V+)-V_{e2}$, where $V_{e2}$ is the drop across transistor 12. Actually, $V_{16}$ initially rises above V+, pulled by the energy stored in inductor 62, until inductor 62 discharges. From this point in time until the next switch at $t_1$, there is no voltage across inductors 62 and 64. The current in inductor 62 decays at a rate of (V12+V17)/L62, as shown in FIG. 7(e), where V12 is the drain-source voltage across transistor 12, V17 is the voltage drop across diode 17 and L62 is the inductance of inductor 62.

At $t_1$, transistor 12 turns off and transistor 14 turns on. In response, $V_{16}$ drops to just above V– due to the energy stored in inductor 62 while transistor 12 was conducting. Inductor 62 discharges this energy by pulling node 70 negative until diode pair 68 turns on so current can be conducted through diode pair 68, inductor 62 and inductor 19. The energy in inductor 62 will hold node 16 above V– until inductor 62 discharges. In this way, part of the energy stored in inductor 62 will be transferred to the load, but most of the stored energy is lost to heat. The same is true for inductor 64 in the opposite phase. Once inductor 62 discharges, $V_{16}$ settles to $(V-)-V_{e1}$, where $V_{e1}$ is the forward voltage on diode 18.

SUMMARY OF THE INVENTION

The foregoing problems are solved by the present invention. One embodiment of a PWM inverter according to the present invention includes a first switching transistor and a second switching transistor to generate power at an output voltage which is a function of a duty cycle of an input control signal and voltages at a positive rail and a negative rail, wherein the first switching transistor switches current from the positive rail through a first current node to an output load and the second switching transistor switches current from the negative rail through a second current node to the output load. The PWM inverter also includes a number of components to capture switching power that would otherwise be lost as heat and provide that switching power to the output of the PWM inverter. For example, a first inductor is coupled between the first current node and a first intermediate node and a second inductor is coupled between the second current node and a second intermediate node and a first output inductor is coupled between the first intermediate node and an output node while a second output inductor is coupled between the second intermediate node and the output node. A first diode pair is coupled between the second current node and the positive rail wherein current flows from the second current node to the positive rail when the first diode pair is forward biased. A second diode pair is coupled between from the negative rail and the first current node wherein current flows from the negative rail to the first current node when the second diode pair is forward biased.

In alternate embodiments, each diode pair might be supplemented with additional diodes, thus providing a shunt path of three or more diodes. One advantage of the diode pairs is that they shunt energy that might otherwise overload the switching transistors. One advantage of the inductors is that they discharge their energy to the load when current through them stops.

A further understanding of the nature and advantages of the inventions herein may be realized by reference to the remaining portions of the specification and the attached drawings.

DESCRIPTION OF THE PREFERRED EMBODIMENTS

Figure 1:
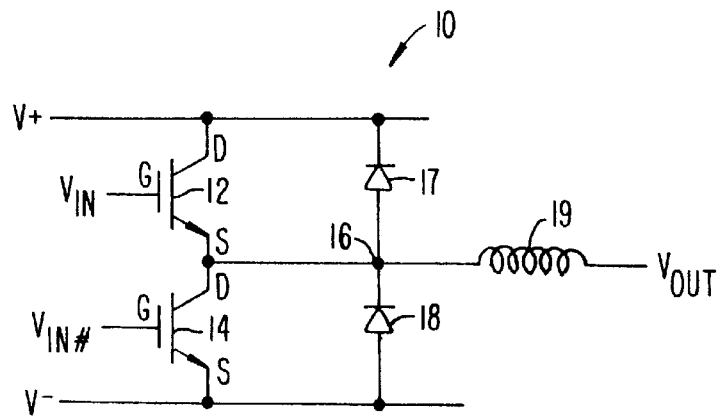
FIG. 1 is a schematic diagram of a basic PWM inverter circuit known in the art.
Figure 2:
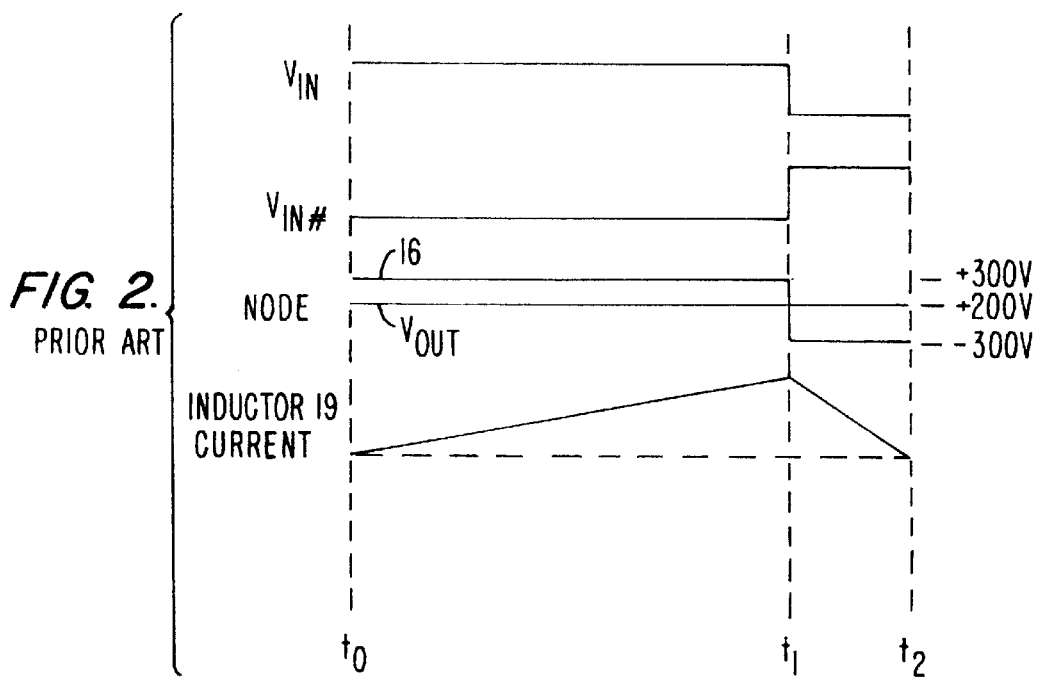
FIG. 2 is a timing diagram showing the relationship of voltages over time of several nodes in the circuit shown in FIG. 1.
Figure 3:
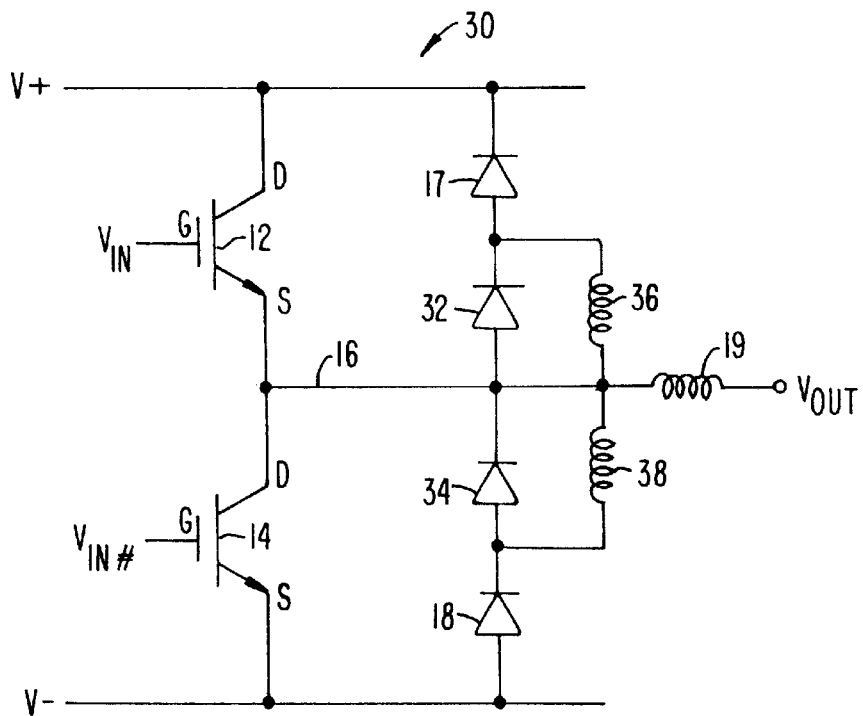
FIG. 3 is a schematic diagram of a PWM inverter circuit known in the art that uses diodes and inductors to control current flow during switching.
Figure 4:
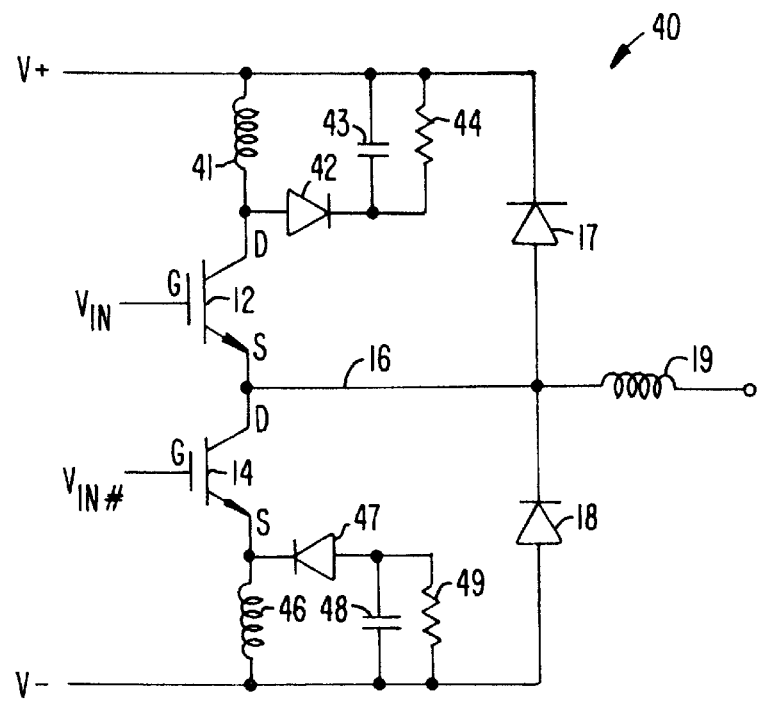
FIG. 4 is a schematic diagram of a PWM inverter circuit that uses a lossy circuit to dissipate the reverse recovery power.
Figure 5:
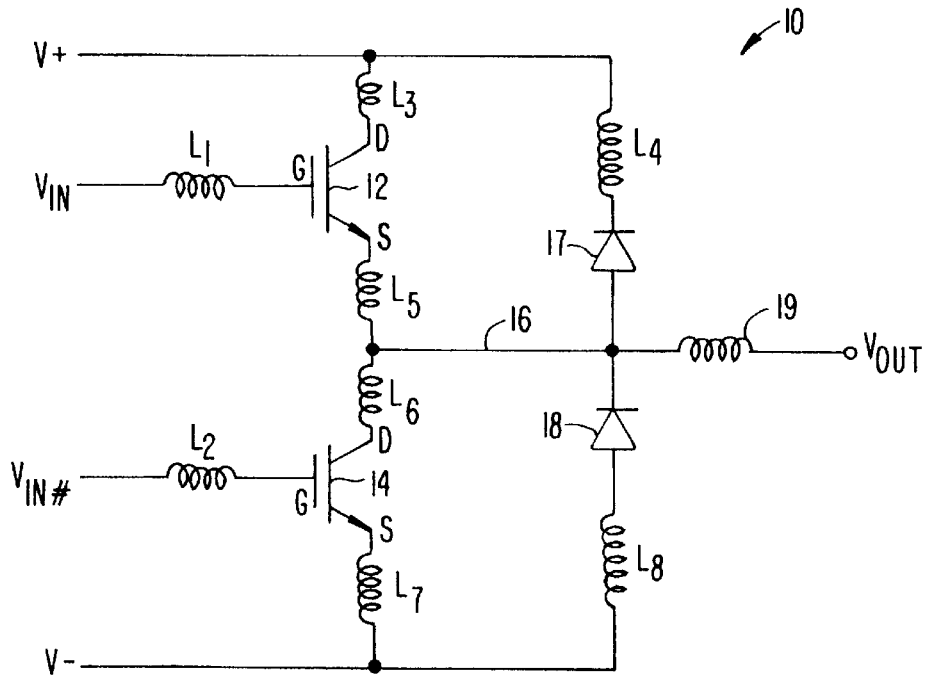
FIG. 5 is a schematic diagram of the circuit shown in FIG. 1, explicitly showing parasitic inductances.
Figure 6:
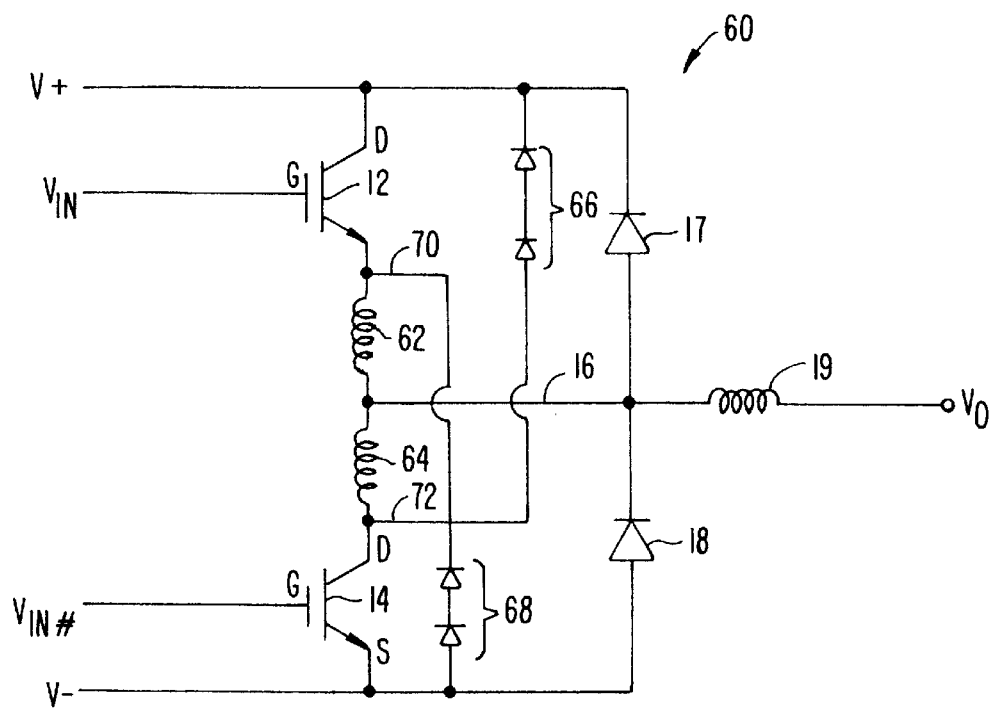
FIG. 6 is a schematic diagram of a PWM inverter circuit that improves over the circuit shown in FIG. 4.
Figure 8:
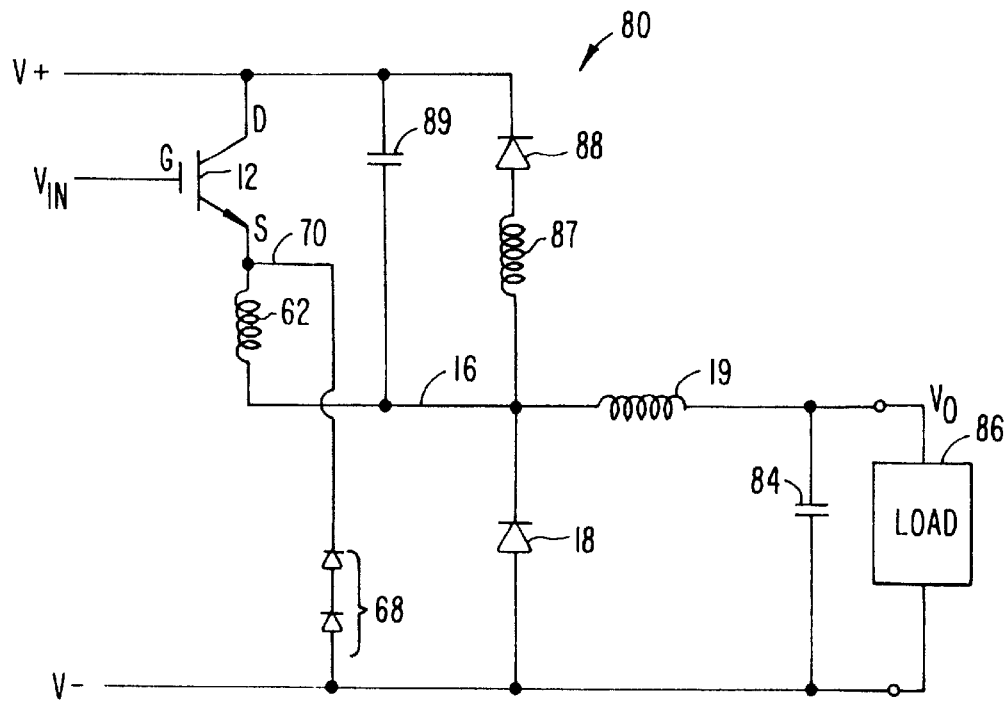
FIG. 8 is a schematic diagram showing how a subset of the components in the circuit of FIG. 6 is improved with the addition of certain components to form a step-down DC/DC converter.
Figure 9:
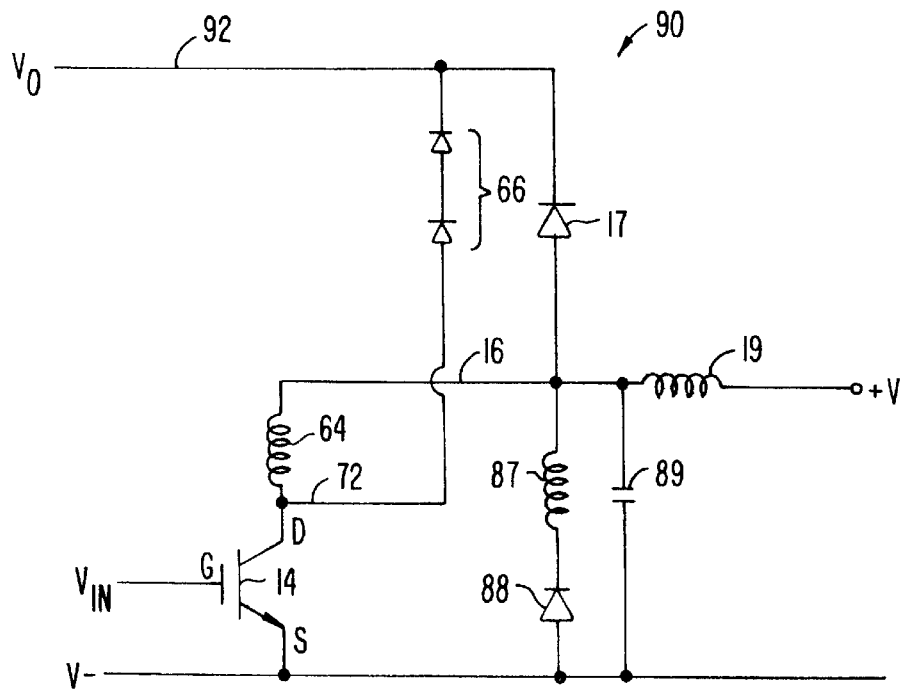
FIG. 9 is a schematic diagram showing how a subset of the components in the circuit of FIG. 6 is improved with the addition of certain components to form a boost DC/DC converter.

FIGS. 8 and 9 show two applications of the circuit shown in FIG. 6. FIG. 8 is a schematic diagram of a step-down DC/DC converter 80. Many of the components shown in FIG. 8 can be found in circuit 60 (FIG. 6), with like elements being like numbered. Converter 80 has fewer components than circuit 60, as converter 80 does not use the negative (transistor 14) side of circuit 60. An inductor 87 is provided in series with a diode 88, and those two components are in parallel with a capacitor 89. Capacitor 89 helps remove some of the energy stored in inductor 62 so that diode 18 can withstand the peak voltage when the circuit switches.

FIG. 9 is a schematic of a boost converter 90 that also uses components from circuit 60. Although boost converter 90 could be more conventionally drawn with the rails both on the left and the output on the right, FIG. 9 is mapped onto a subset of the components of FIG. 6 to show the application of a boost converter. Where one terminal of inductor 19 was the output of circuit 60, with boost converter 90, that terminal is the input for the V+ rail and where line 92 in FIG. 9 corresponded to the V+ rail in circuit 60, line 92 is the output for boost converter 90.

Capacitor 89, inductor 87 and diode 88 allow the voltage at node 16 to go below V−. With the voltage at node 16 below V−, inductor 19 builds up current faster, thus storing energy faster. The excess energy comes from the energy stored in inductor 64 during the reverse recovery process from diode 17.

Energy that would push the voltage at node 16 too negative for diode 17 to withstand is temporarily stored in capacitor 89 and is released to inductor 19 gradually. This results in much less energy dissipation, as the reverse recovery energy stored in inductor 64 would be turned into heat in transistor 14, diode 88 and the series resistance of inductor 64. Such circuits work at high frequencies (often above 500 kHz) to reduce the size of the magnetic components. At high frequencies, the power of the reverse recovery process is quite large, since the power is proportional to the frequency.

Figure 10:
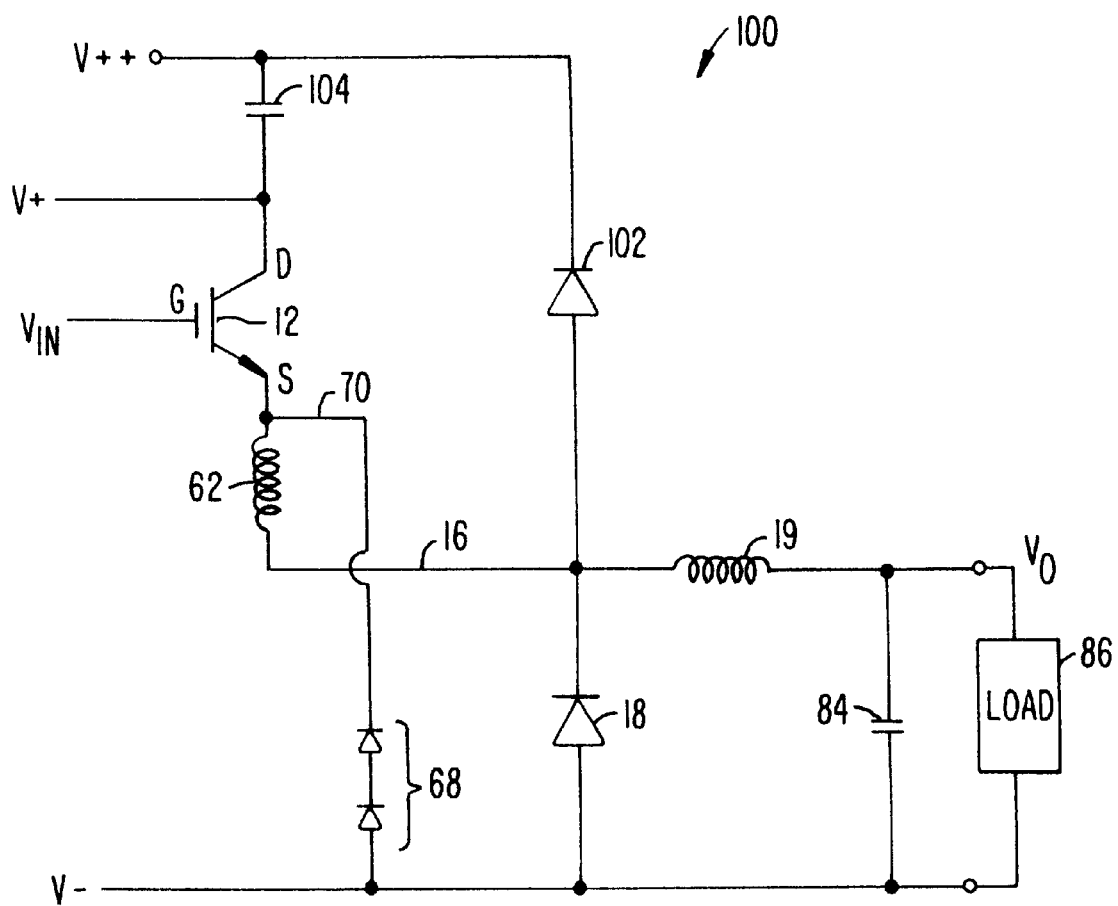
FIG. 10 is a schematic diagram of an improvement of the circuit shown in FIG. 8 according to one aspect of the present invention.

FIG. 10 illustrates an improvement of the circuit shown in FIG. 8 according to one aspect of the present invention. In FIG. 10, circuit 100 includes many of the same components of circuit 80 and additionally includes a diode 102 coupled between node 16 and a voltage node (the "charging" node) at which a voltage V++ is either applied or charged to by the circuit, with diode 102 coupled such that it is reversed biased when V++ is higher (by at least a turn-on voltage) than the voltage at node 16. A filter capacitor 104 is also provided between the V++ node and the V+ node.

In order to pull node 70 close to V+, the gate of transistor 12 would need to be biased 12–15 V higher than V+, and V++ can be used for this purpose, by using the recovered current in the gate drive circuit (not shown). Drawing node 70 close to V+ is desirable, because the power dissipated in transistor 70 is effectively the drain-source voltage times the drain-source current. If the drain and source are kept close to the same voltage (V+) during the peak current period, the power dissipation can be reduced.

Diode 102 limits the node 16 voltage, while still allowing for quick removal of the stored energy from inductor 62. Diode 102 directs the excess energy from inductor 62 into filter capacitor 104. The bulk of the energy stored in inductor 62 is still delivered to load 86, because of the increased voltage at node 16. The excess energy that would make the voltage at node 16 too high for diode 18 is made available at V++ for other uses.

Figure 11:
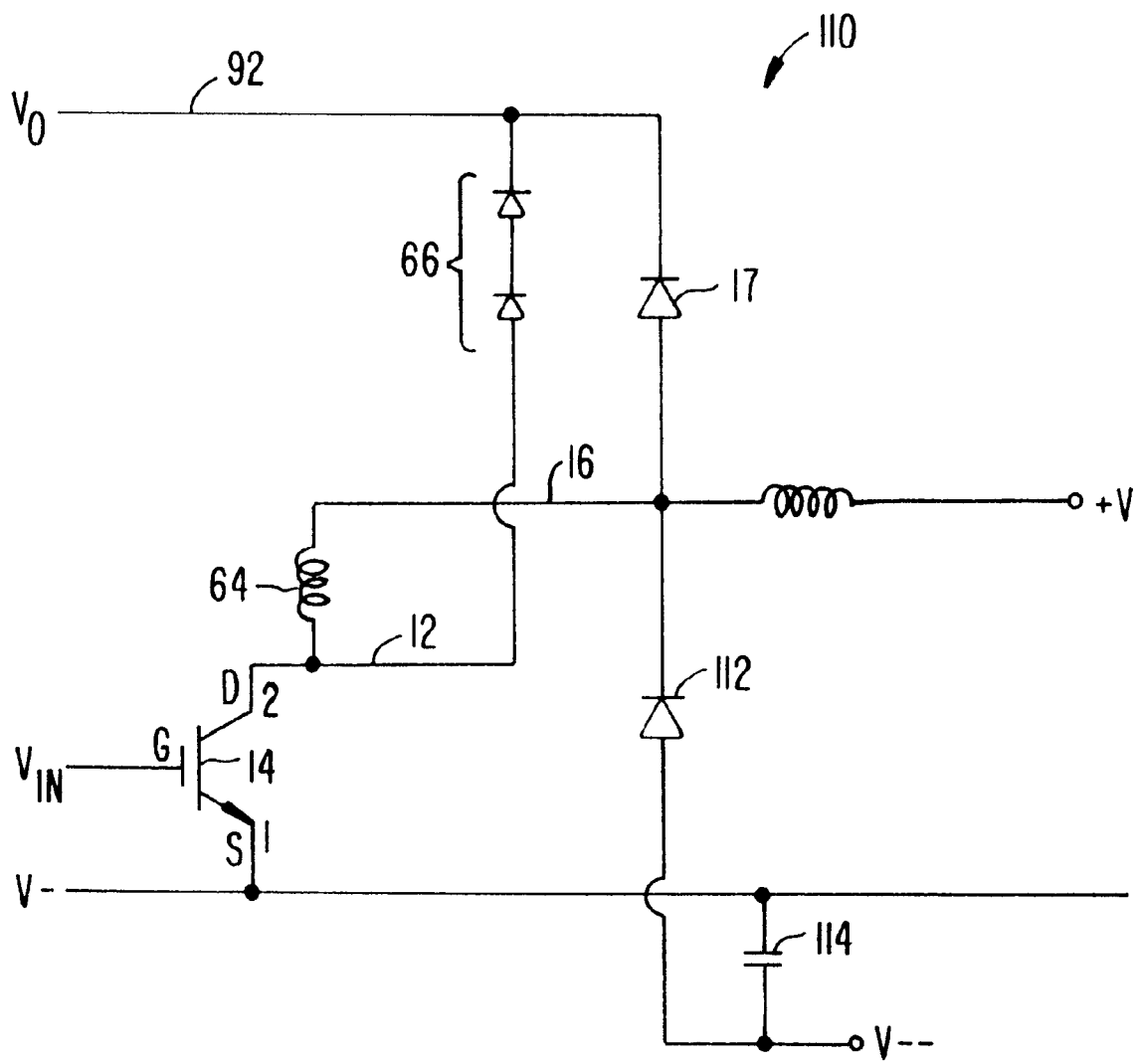
FIG. 11 is a schematic diagram of an improvement of the circuit shown in FIG. 9 according to one aspect of the present invention.

FIG. 11 shows a similar approach to that of FIG. 10 being taken to improve a boost converter such as boost converter circuit 90 shown in FIG. 9. In the circuit 210 of FIG. 11, a diode 112 is provided between a V−− node and node 16 such that current flows between the V−− node and node 16 when diode 112 is forward biased. A filter capacitor 114 is provided between the V−− node and the V− rail.

Diode 112 directs the excess stored energy from inductor 72 to filter capacitor 114. The bulk of the energy is delivered to load 86, due to the negative voltage at node 16 transferring the energy to inductor 19. In many cases, negative gate drive is used for DMOS transistors or IGBT's such as transistor 14. The gate of transistor 14 is driven from a negative voltage (−5V to −15V) to (+12 V to +15V). The negative voltage (from V−−) provides some margin for the off state and can speed up the turn off process of transistor 14.

Figure 12:
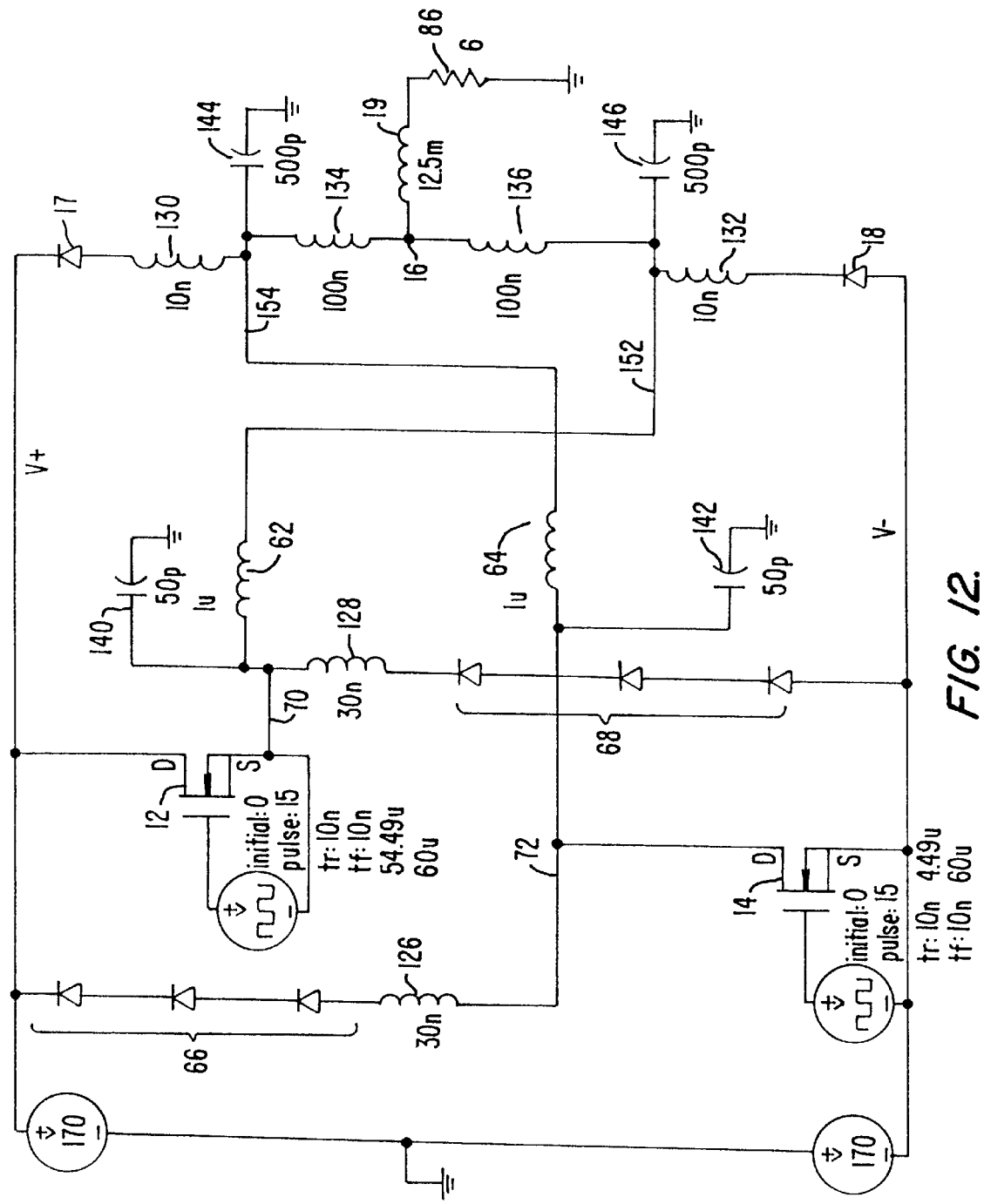
FIG. 12 is a schematic diagram of an improved PWM inverter circuit according to one embodiment of the present invention.

The circuit of FIG. 12 improves upon the circuit of FIG. 6, with the addition of several components. Those components include inductors 126, 128, 130, 132, 134, 136, and capacitors 140, 142, 144, 146. Inductors 126, 128, 130, 132 are parasitic inductors and capacitors 140, 142 are parasitic capacitors, shown to illustrate their impact on circuit operation.

Inductors 126 and 128 are in series with diode pairs 66 and 68 respectively. Diode pairs 66, 68 are shown as three diodes each in FIG. 12, but two or more than three diodes also work, under suitable conditions. Inductors 130 and 132 are in series with diodes 17 and 18, respectively. As for the other two inductors, inductor 134 is inserted between inductor 64 (at node 154) and node 16 and inductor 136 is inserted between inductor 62 (at node 152) and node 16. Sample values are as shown in FIG. 12.

Each of the added capacitors is a 50 pF capacitor. Capacitor 140 is between one end of inductor 62 (node 70) and ground and capacitor 142 is between one end of inductor 64 (node 72) and ground. Capacitor 144 is between node 154 and ground, while capacitor 146 is between node 152 and ground.

The effects of these added components on the signals present at various nodes and components of the circuit of FIG. 12 will now be described, with occasional reference to the timing diagrams of FIG. 13.

Figure 7:
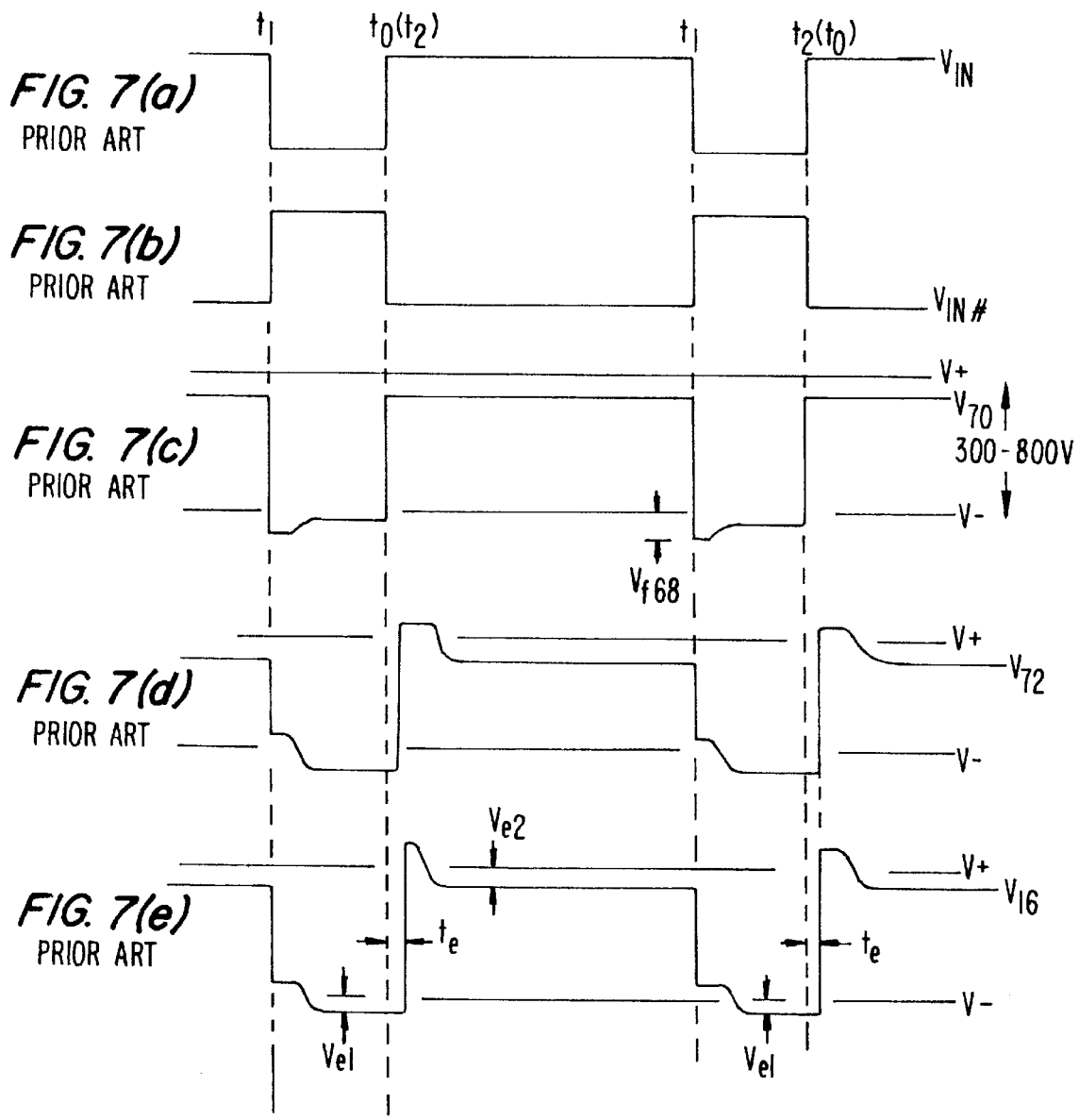
FIGS. 7(a)–(e) are timing diagrams for signals in the circuit of FIG. 6.

The current in inductor 62 reaches its maximum at $t_2$ (see FIG. 7) just after diode 18 completes its reverse recovery. The voltage at node 154 is free to rise, as there are two inductors between nodes 152 and 154. As the voltage rises, current will start building up through inductors 134 and 136, and node 16 will be substantially above node 154. The load current (in inductor 19) will flow through the increased voltage at node 16. This in turn will remove the stored energy from inductor 62 in less time than if inductor 62 were unassisted. The voltage at node 152 is limited by capacitor 146, which will absorb some of the energy from inductor 62 and will cause the voltage to remain above V+ longer, but without substantially prolonging the time during which transistor 12 has to conduct high current. Likewise, capacitor 144 limits the voltage rise at node 154.

Due to the increased voltage at node 152, diode 18 may be subjected to higher voltages, and thus have to be a higher voltage diode than the diode used in the circuit of FIG. 6. The size of diode 18 can be controlled by suitable selection of the value of capacitor 146. Even if a higher voltage diode is required for diode 18, the savings in component stress and dissipation more than compensate for the very slight cost increase of diode 18.

In a somewhat different circuit, inductors 134 and 136 can be designed so that they saturate at a certain current above the peak load current, so that inductors 134, 136 limit the voltage at node 152. If the saturation point is chosen properly, the saturation will only happen near the peak of the load current (most of the time the load current is a sine wave) and not all the time. This provides the circuit with another adjustment that allows further optimization of efficiency and component stress.

Figure 13A:
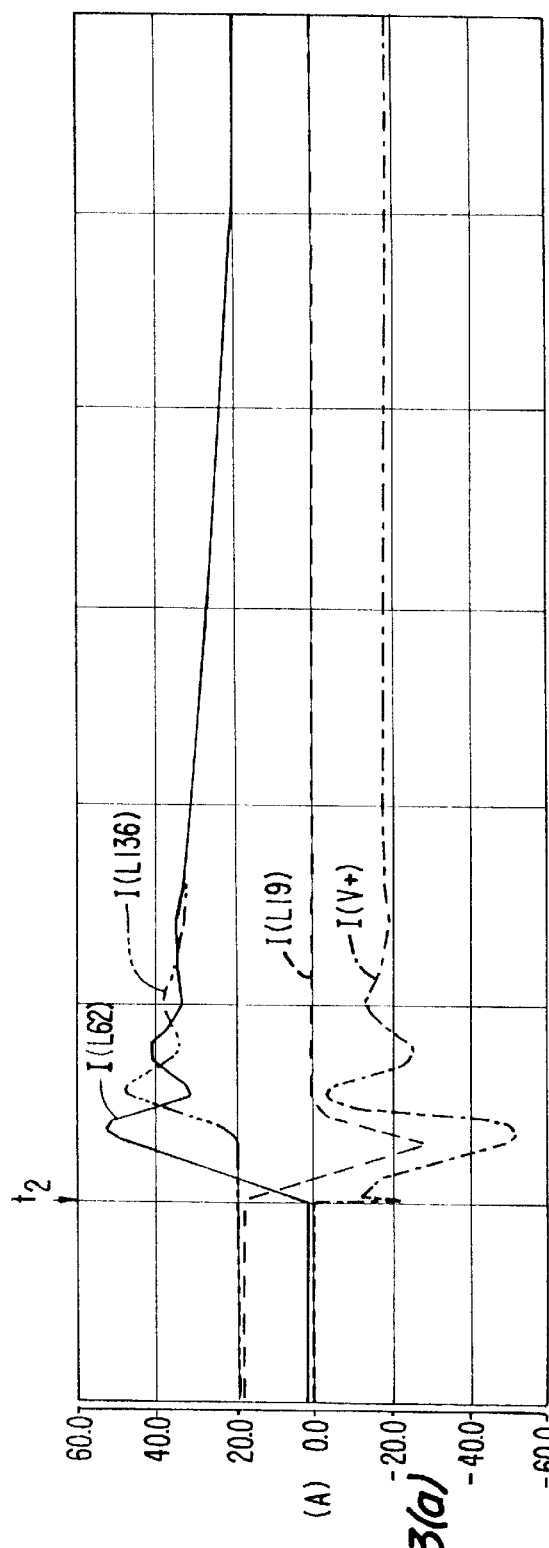
FIGS. 13(a)–(b) are timing diagrams for signals in the circuit of FIG. 12.
Figure 13B:
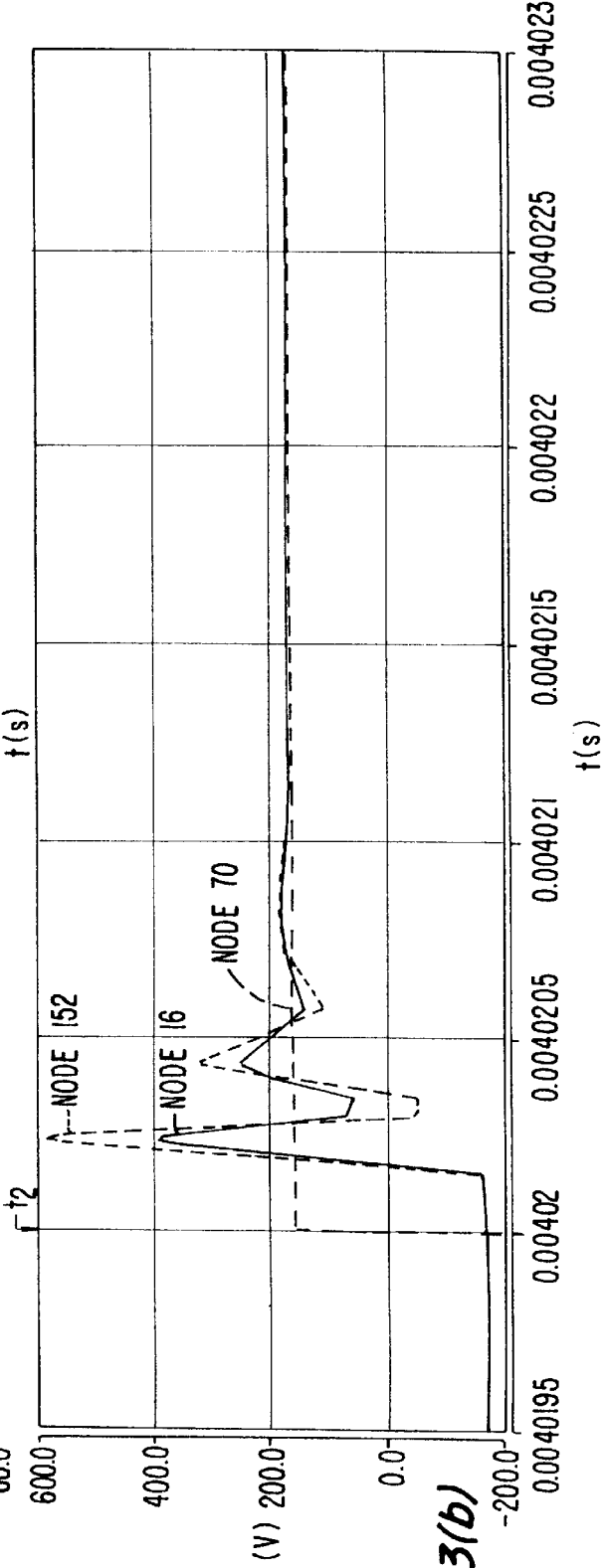

FIGS. 13*a*–*b* is a set of timing diagrams of current and voltage for several nodes in the circuit of FIG. 12, showing the circuit reaction around the time $t_2$ in detail. As shown in the currents diagram (FIG. 13(a)), the current through transistor 12 rises at $t_2$ to about 50 amps then quickly drops to below 40 amps. In 2.25 microseconds, it drops to 20 amps, which is the load current.

The current drawn from the power supply, I(V+), is the sum of the reverse recovery current of diode 18 and the load current. The first spike shown in FIG. 13(a) for the current I(V+) is caused by parasitic capacitance at node 70. The current I(V+) settles to 20 amps in less than 0.5 microseconds. That current is limited by inductor 62. If a larger inductance is used for inductor 62, the peak reverse recovery current will be lower and this is very beneficial. Increasing the inductance of inductor 62 too much, however, slows the current decay and prolongs the time excess current flows in transistor 12 if circuit 60 (FIG. 6) were used. This prolongation is overcome in the circuit of FIG. 12, allowing a larger inductance to be used for inductor 62 to reduce the peak current in transistor 12 and diode 18. With reduced peak current, smaller (and therefore, less expensive) transistors can be used for transistors 12 and 14. Minimizing the peak current is important because a transistor may come out of saturation when both current and voltage are present across the transistor.

FIG. 13(b) shows the voltage at nodes 16, 70 and 152 of the circuit of FIG. 12. Note that if transistor 12 comes out of saturation due to the reverse recovery current, the result is increased power dissipation. However, as indicated by FIG. 13(b), the voltage at node 16 increases, due to the action of inductor 134 in one direction and inductor 136 in the other direction, to substantially more than V+. That increase allows the excess energy from inductor 62 to be removed quickly and efficiently transferred to the load.

Figure 14:
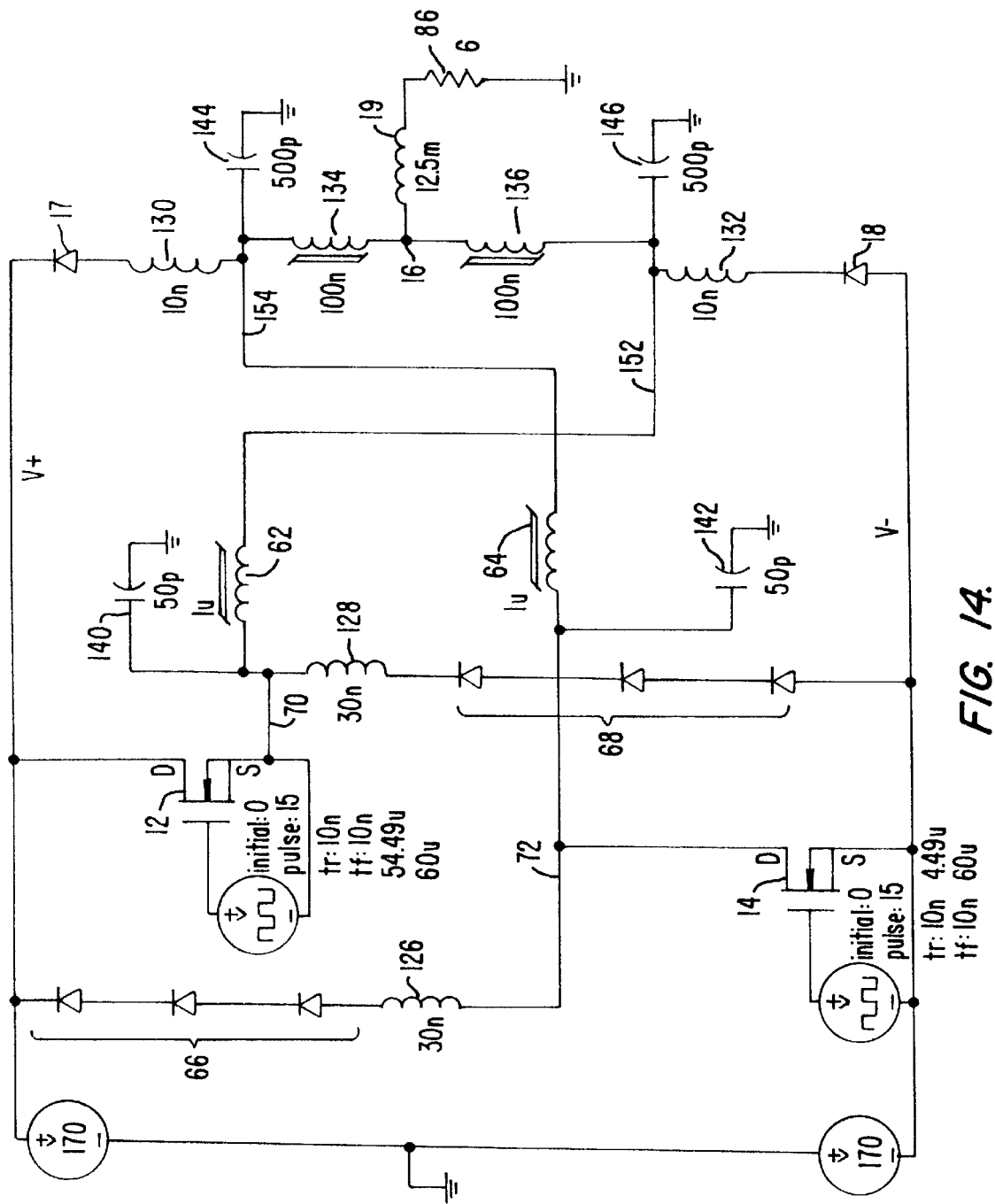
FIG. 14 is a schematic diagram of a variation of the circuit of FIG. 12.

FIG. 14 illustrates one variation of the circuit of FIG. 12. In this variation, inductors 62 and 64 are replaced with saturable inductors 162 and 164, respectively. In FIG. 14, inductors 134 and 136 are also represented as saturable inductors. These saturable inductors affect the voltage swings at node 16 such that there is better energy transfer to the output from inductor 62, which accumulates the energy from the reverse recovery of diode 18. During the part of a cycle where the load current is flowing through inductor 136, inductor 136 saturates and acts as a short (i.e., the voltage drop across inductor 136 is zero), while inductor 134 still shows its full inductance. Inductor 134 shows its full inductance because, at that point, there is little current through inductor 134. Inductor 136 saturates because of the large current through it, which is the combination of the load current and the current accumulated in inductor 62.

Figures 15A, 15B, 15C:
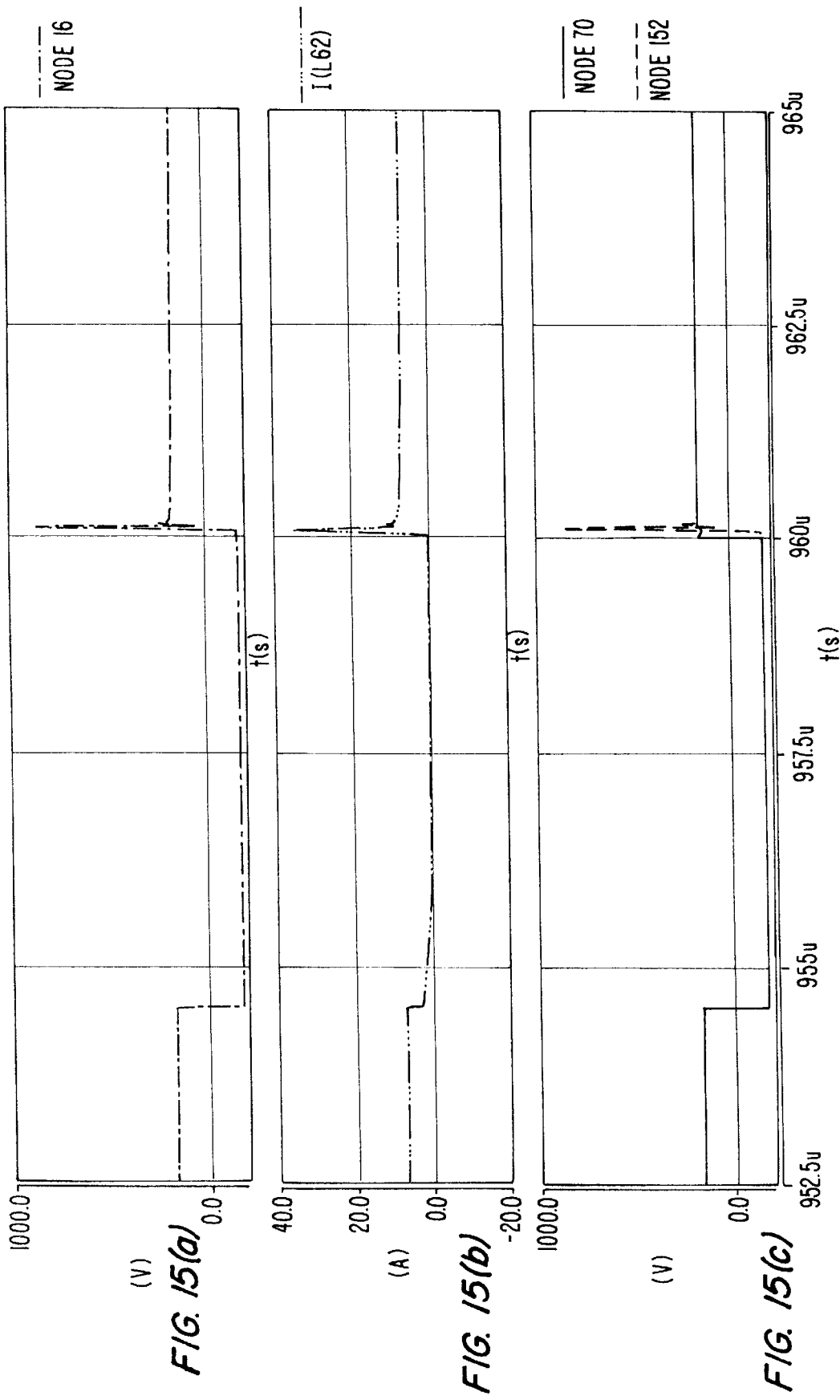
FIGS. 15(a)–(c) are timing diagrams for signals in the circuit of FIG. 14.
Figure 16A:
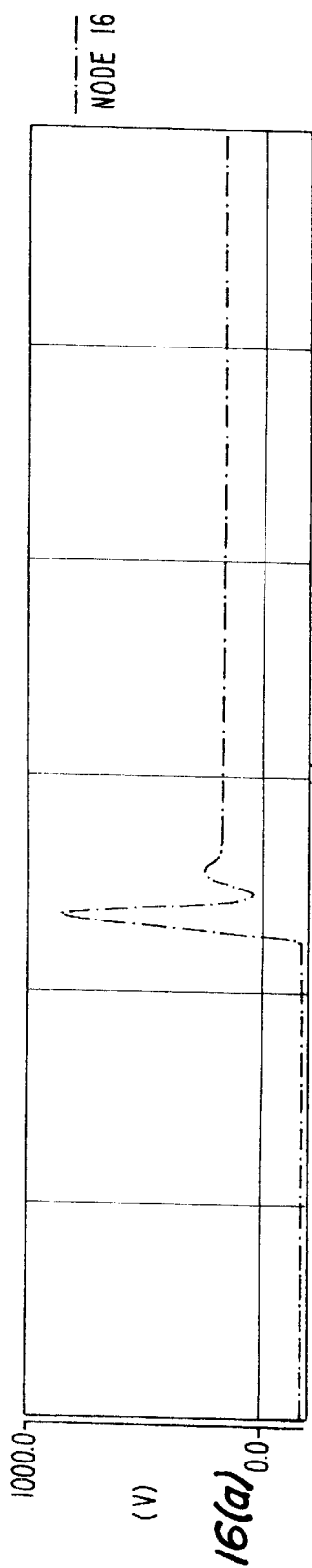
FIGS. 16(a)–(c) are timing diagrams for signals in the circuit of FIG. 14, with a finer time resolution than the time resolution of FIGS. 15(a)–(c).
Figure 16B:
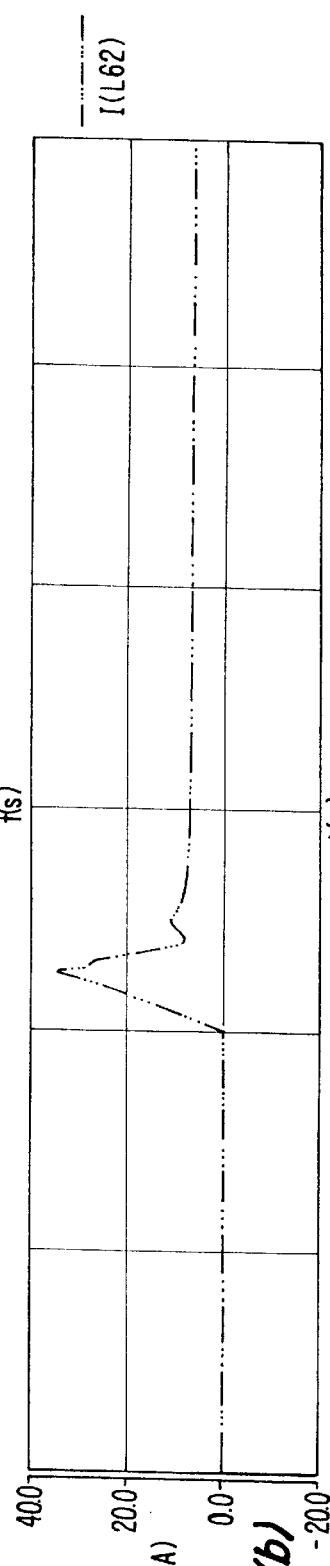
Figure 16C:
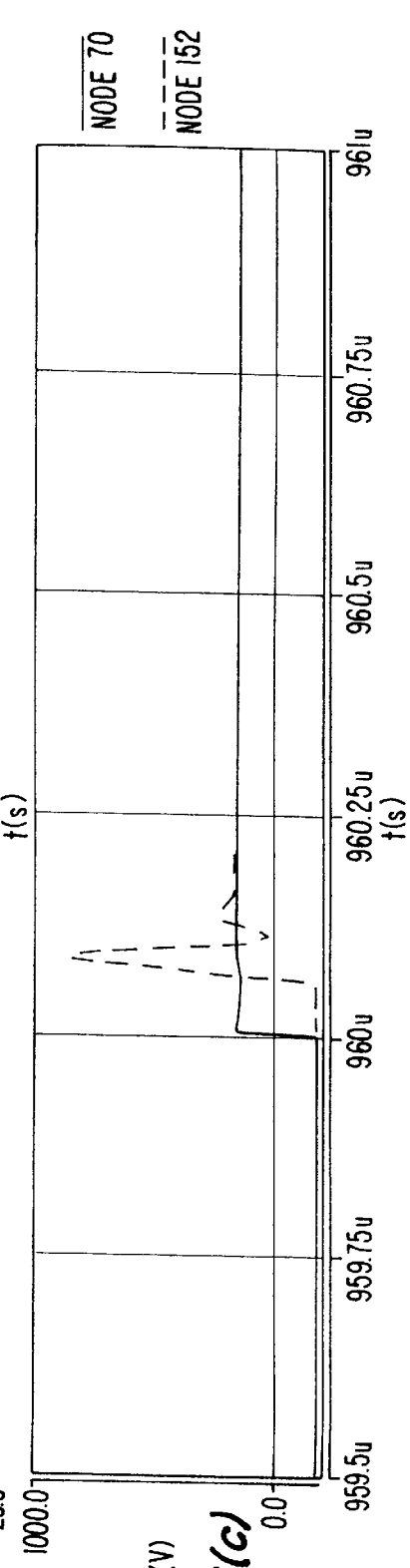
Figures 17A, 17B, 17C:
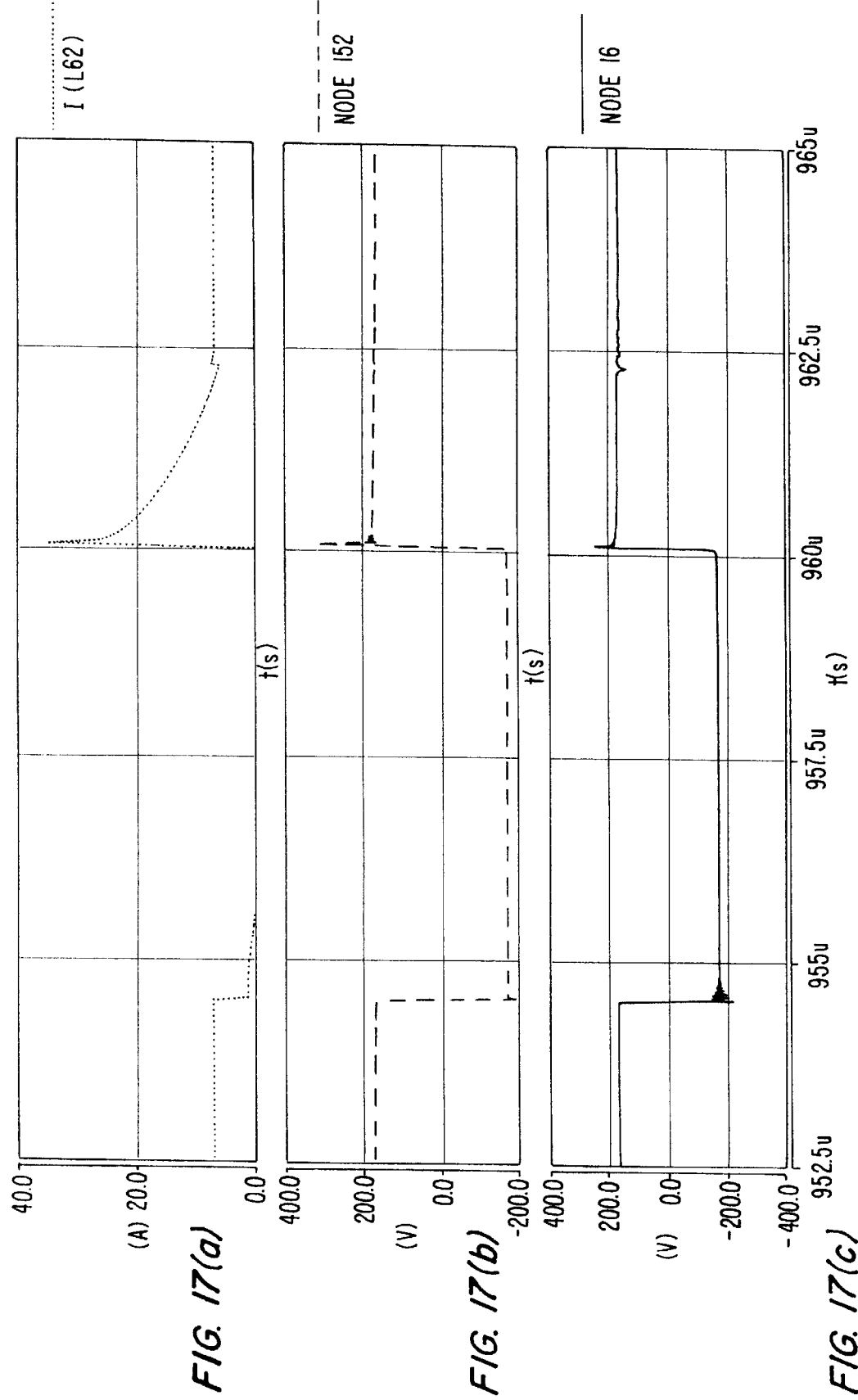
FIGS. 17(a)–(c) are timing diagrams for signals in the circuit of FIG. 14.
Figures 18A, 18B, 18C:
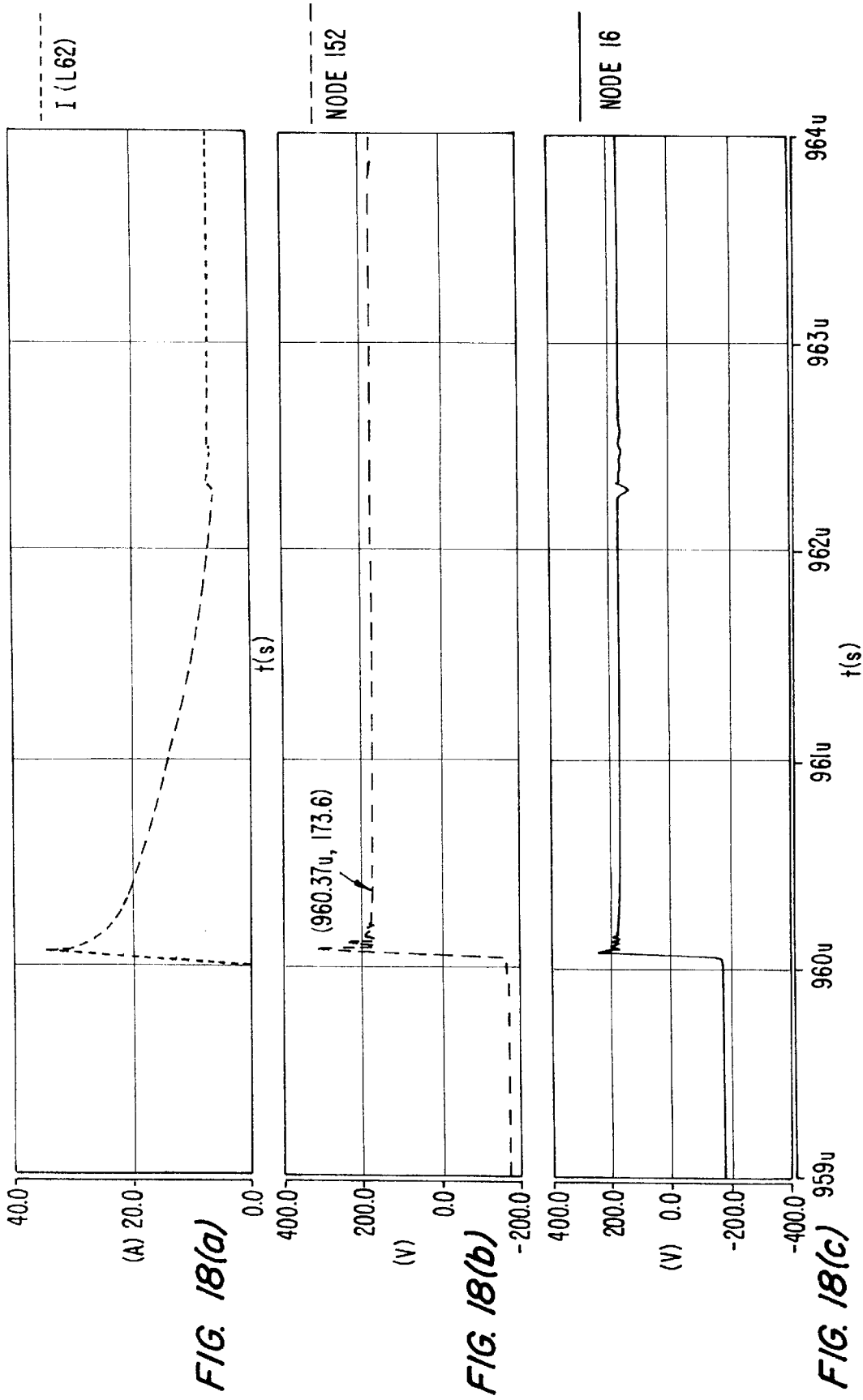
FIGS. 18(a)–(c) are timing diagrams for signals in the circuit of FIG. 14, with a finer time resolution than the time resolution of FIGS. 17(a)–(c).
Figures 19A, 19B, 19C:
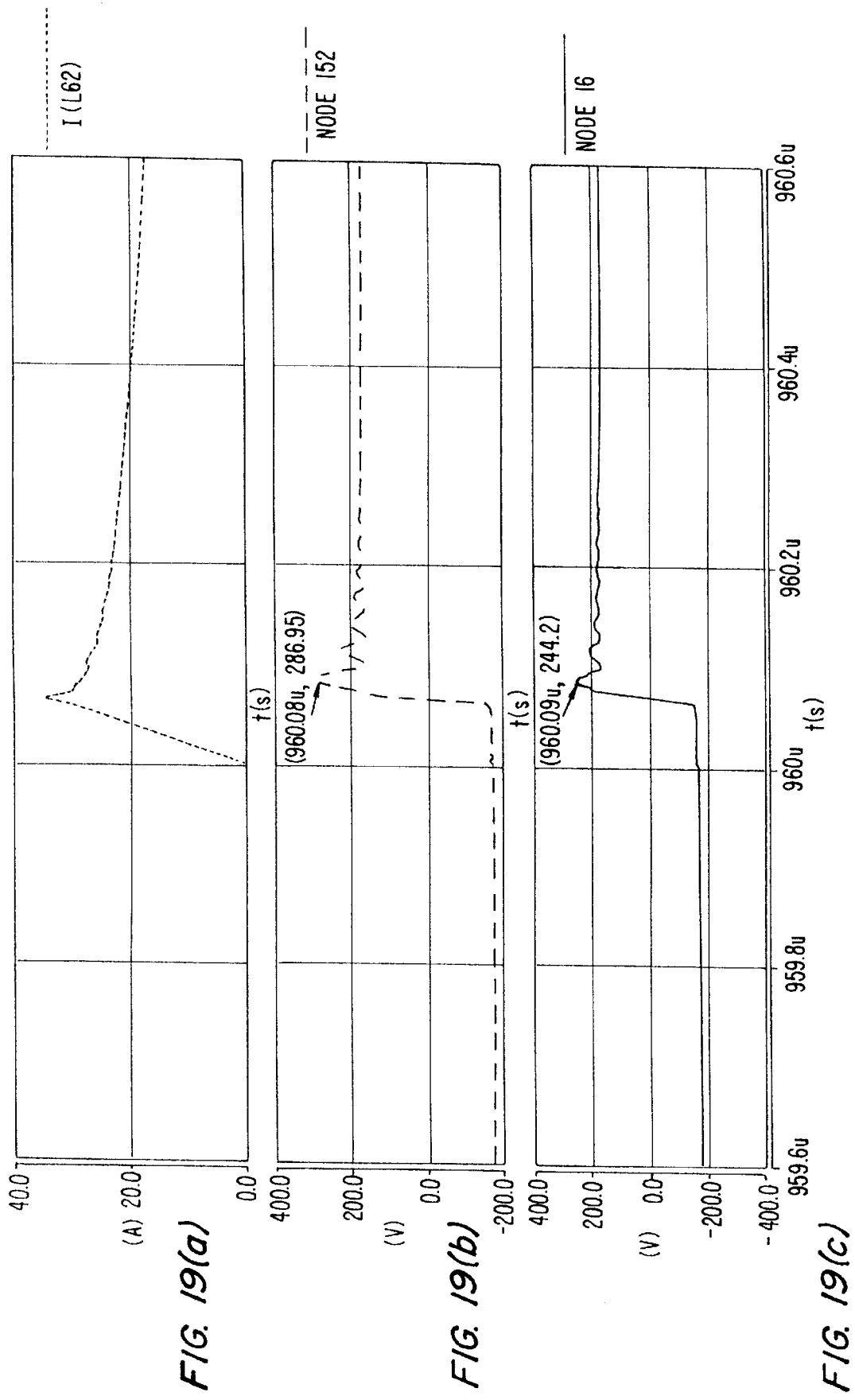
FIGS. 19(a)–(c) are timing diagrams for signals in the circuit of FIG. 14, similar to FIGS. 17–18, but with even finer time resolution.

FIGS. 15a–c is a set of timing diagrams of currents and voltages in the circuit shown in FIG. 14. As the timing diagrams of FIGS. 15(a) and 15(c) illustrate, node 16 and node 152 are at the same voltage, indicating that inductor 136 is in saturation. As shown in FIG. 15(b), the current though inductor 62 falls quickly after peaking, due to the voltage rise at node 152 (see FIG. 15(c)). The energy transfer improves, but at the cost of allowing the voltage at node 16 to rise to about 800V. The peak rise at node 16 can be lowered by adjusting the size of capacitors 144 and 146 (see FIG. 14). Those capacitors 144 and 146 are shown in FIG. 14 with values of 100 pF, but higher values, in the range of 400 pF to 1000 pF, result in a lower peak voltage at node 16.

FIGS. 15–19 illustrate the effects of altering the values of inductors 134 and 136 and capacitors 144 and 146.

The peak voltage and peak current can be both controlled by suitable selection of the values of inductors 134 and 136 and capacitors 144 and 146. Also, using inductors that saturate for inductors 134 and 136 with larger capacitors for capacitors 144 and 146 are especially effective.

A preferred embodiment of the present invention and a few variations and applications have now been described. The above description is illustrative and not restrictive. Many variations of the invention will become apparent to those of skill in the art upon review of this disclosure. Merely by way of example, other configurations of diodes can be used, as long as the forward voltages of the main diodes (17, 18) are lower than the turn-on voltages of the shunt diode pairs (66, 68), so that a diode pair does not turn on because of the forward voltage drop across a main diode. For example, single diodes might be used instead of diode pairs, or more than two diodes might be used. The use of at least three diodes would be indicated where a main diode has a forward voltage of 1.3V at its designed current but each shunt diode has a turn on voltage of 0.65V or less. As the shunt diodes can be small, and therefore relatively inexpensive, adding a third shunt diode should not be a problem. The scope of the invention should, therefore, be determined not with reference to the above description, but instead should be determined with reference to the appended claims along with their full scope of equivalents.

What is claimed is:

1. A switching circuit which uses at least a first switching transistor (12) and a second switching transistor (14) to generate power at an output voltage which is a function of a duty cycle of an input control signal and voltages at a positive rail and a negative rail, wherein the first switching transistor switches current from the positive rail through a first current node (70) to an output load and the second switching transistor switches current from the negative rail through a second current node (72) to the output load, the switching circuit comprising:

a first inductor (62) coupled between the first current node and a first intermediate node (152);

a second inductor (64) coupled between the second current node and a second intermediate node (154);

a first diode means (66) for substantially limiting flow of current to one direction, wherein current flows through the first diode means from the second current node to the positive rail when the first diode means is forward biased;

a second diode means (68) for substantially limiting flow of current to one direction, wherein current flows through the second diode means from the negative rail to the first current node when the second diode means is forward biased;

a first output inductor (136), coupled between the first intermediate node and an output node (16), wherein the output load is coupled to the output node; and a second output inductor (134), coupled between the second intermediate node and the output node.

2. The switching circuit of claim 1, further comprising:

a positive rail diode (17) coupled to the positive rail and the second intermediate node such that current flows through the positive rail diode from the second intermediate node to the positive rail when the positive rail diode is forward biased;

a negative rail diode (18) coupled to the negative rail and the first intermediate node such that current flows through the negative rail diode from the negative rail to the first intermediate node when the negative rail diode is forward biased; and an output inductor (19) coupled between the output node and the load.

3. The switching circuit of claim 1, wherein the first diode means is a first diode pair and the second diode means is a second diode pair.

4. The switching circuit of claim 1, wherein the first diode means and the second diode means are each single diodes.

5. The switching circuit of claim 1, wherein the first diode means is three or more small, inexpensive diodes and the second diode means is three or more small, inexpensive diodes.

6. The switching circuit of claim 1, wherein the negative rail voltage is a voltage less than the positive rail voltage and lower than a ground voltage.

7. The switching circuit of claim 1, further comprising:

a first output capacitor (146) coupled to the first intermediate node; and a second output capacitor (144) coupled to the second intermediate node.

8. The switching circuit of claim 1, wherein the first inductor is a saturable inductor and the second inductor is a saturable inductor.

9. The switching circuit of claim 1, wherein the first output inductor is a saturable inductor and the second output inductor is a saturable inductor.

10. The apparatus of claim 1, wherein the switching circuit is a pulse width modulated circuit.

11. The apparatus of claim 1, wherein the switching circuit is a pulse frequency modulated switching circuit.

12. A step-down DC/DC converter comprising:

a switching transistor (12) having a gate coupled to a control signal, wherein a conversion ratio is a function of a duty cycle of the control signal, the switching transistor having first and second transistor terminals wherein one of the terminals is a transistor source terminal and the other is a transistor drain terminal;

a positive rail, coupled to the first transistor terminal;

a negative rail;

a charging rail;

a first inductor (62) coupled between the second transistor terminal and an intermediate node (16);

shunt diode means (68) for substantially limiting flow of current to one direction, wherein current flows from the negative rail to the second transistor terminal when the shunt diode means is forward biased;

a first diode (18) coupled to the intermediate node and the negative rail such that current flows through the first diode from the negative rail to the intermediate node when the first diode is forward biased;

an output inductor (19), coupled between the intermediate node and an output of the step-down DC/DC converter;

a second diode (102) coupled to the intermediate node and the charging rail such that current flows through the second diode from the charging rail to the intermediate node when the second diode is forward biased; and a capacitor (104) coupled between the charging rail and the positive rail.

13. The step-down DC/DC converter of claim 12, further comprising an output filter capacitor (84) coupled between the output of the step-down DC/DC converter and the negative rail.

14. The step-down DC/DC converter of claim 12, wherein the shunt diode means is one or more diodes in series with a collective turn-on voltage at greater than a forward voltage of the first diode when a design current is flowing in the first diode from the negative rail to the intermediate node.

15. A boost converter comprising:

a switching transistor (14) having a gate coupled to a control signal, wherein a conversion ratio is a function of a duty cycle of the control signal, the switching transistor having first and second transistor terminals wherein one of the terminals is a transistor source terminal and the other is a transistor drain terminal;

a positive rail;

a negative rail, coupled to the first transistor terminal;

a charging rail;

a first inductor (64) coupled at a first terminal to the second transistor terminal and coupled at a second terminal to an intermediate node (16);

shunt diode means (66) for substantially limiting flow of current to one direction, wherein current flows from the second transistor terminal to an output node (92) of the boost converter when the shunt diode means is forward biased;

a first diode (17) coupled to the intermediate node and the output node such that current flows through the first diode from the intermediate node to the output node when the first diode is forward biased;

a second inductor (19), coupled between the positive rail and the intermediate node;

a second diode (112) coupled to the intermediate node and the charging rail such that current flows through the second diode from the charging rail to the intermediate node when the second diode is forward biased; and a capacitor (114) coupled between the charging rail and the negative rail.

16. The boost converter of claim 15, wherein the shunt diode means is one or more diodes in series with a collective turn-on voltage greater than a forward voltage of the first diode when a design current is flowing in the first diode from the intermediate node to the output node.

* * * * *